United States Patent [19]

Duran

[11] Patent Number: 4,906,153
[45] Date of Patent: Mar. 6, 1990

[54] CAPTIVE PANEL FASTENER ASSEMBLY

[75] Inventor: John A. Duran, Glendora, Calif.

[73] Assignee: Avibank Mfg., Inc., Burbank, Calif.

[21] Appl. No.: 219,904

[22] Filed: Jul. 13, 1988

Related U.S. Application Data

[63] Continuation of Ser. No. 914,641, Oct. 2, 1986, abandoned.

[51] Int. Cl.$^4$ .................... F16B 37/04; F16B 39/00
[52] U.S. Cl. ..................... 411/353; 411/103
[58] Field of Search ............... 411/353, 103, 105, 512, 411/999

[56] References Cited

U.S. PATENT DOCUMENTS

| | | | |
|---|---|---|---|
| 1,665,875 | 4/1928 | Comeau | 411/353 X |
| 2,303,673 | 12/1942 | Wilson | 411/353 X |
| 2,492,115 | 12/1949 | Crowther | 411/353 |
| 2,991,816 | 7/1961 | Harbison et al. | 411/111 |
| 3,037,542 | 6/1962 | Boyd | 411/105 |
| 3,180,387 | 4/1965 | Dzus et al. | 411/111 |
| 3,180,388 | 4/1965 | Newcomer, Jr. et al. | 411/353 |
| 3,217,774 | 11/1965 | Pelochino | 411/353 |
| 3,226,145 | 12/1965 | Goldberg | 411/105 X |
| 3,394,747 | 7/1968 | Duffy | 411/353 |
| 4,125,140 | 11/1978 | Basile | 411/105 X |
| 4,174,008 | 11/1979 | Preziosi et al. | 411/353 |
| 4,285,380 | 8/1981 | Gulistan | 411/353 X |
| 4,324,517 | 4/1982 | Dey | 411/353 |
| 4,432,680 | 2/1984 | Molina | 411/105 X |
| 4,464,090 | 8/1984 | Duran | 411/103 |
| 4,655,658 | 4/1987 | Gulistan | 411/353 |
| 4,735,536 | 4/1988 | Duran | 411/999 X |
| 4,747,738 | 5/1988 | Duran | 411/353 |
| 4,749,318 | 6/1988 | Bredal | 411/180 |
| 4,793,757 | 12/1988 | Peterson | 411/353 X |

FOREIGN PATENT DOCUMENTS

| | | | |
|---|---|---|---|
| 1094049 | 12/1960 | Fed. Rep. of Germany | 411/105 |
| 2157786 | 10/1985 | United Kingdom | 411/353 |

*Primary Examiner*—Gary L. Smith
*Assistant Examiner*—Suzanne L. Dino
*Attorney, Agent, or Firm*—Poms, Smith, Lande & Rose

[57] ABSTRACT

A captive panel fastener assembly is disclosed for joining a panel to a sub-structure. The fastener assembly includes a sleeve bolt, a grommet assembly which is attached to the panel and a receptacle assembly which is attached to the sub-structure. The sleeve bolt passes through the grommet assembly and engages the receptacle assembly thereby joining the panel and the sub-structure. The bolt includes an enlarged head at one end, an intermediate body portion and a nose at the other end. A groove is provided between the nose and the body portion of the bolt. The grommet assembly includes a sleeve in a hole in the panel and the sleeve has a plurality of resilient inwardly extending tangs formed out of the body of the sleeve which tangs move inwardly upon insertion of the nose through the sleeve until the nose moves past the tangs and the tangs enter the groove and return to their original inwardly extending position thereby retaining the bolt in a hold out condition with respect to the panel while permitting the bolt to be pushed to a position wherein the tangs ride along the body portion of the bolt until the head thereof abuts against the panel. Thus, the sleeve bolt is retained in the panel and remains in its withdrawn position when the panel is disengaged from the sub-structure.

2 Claims, 4 Drawing Sheets

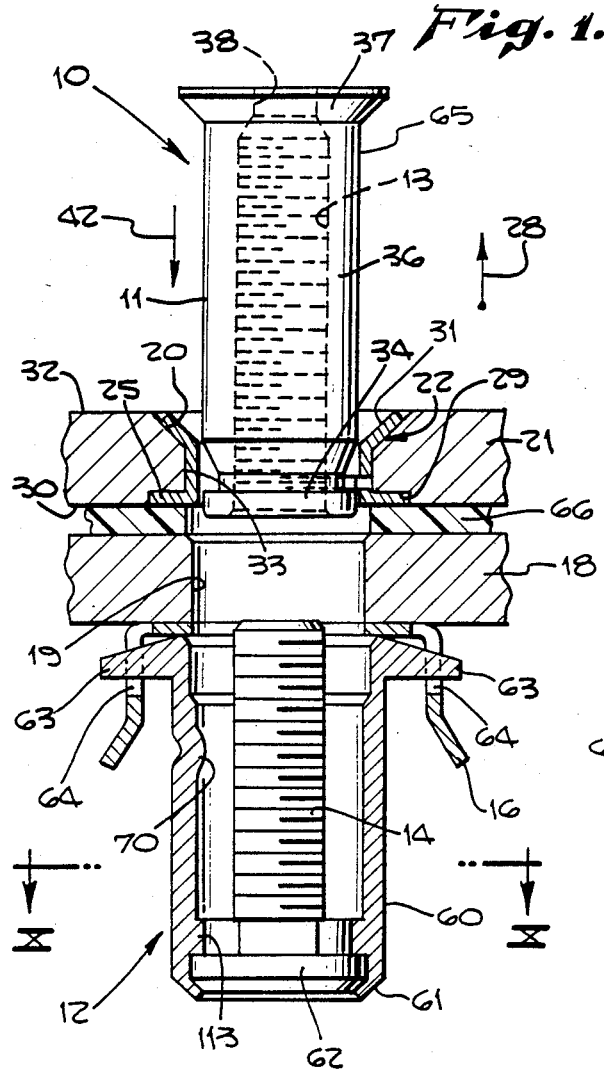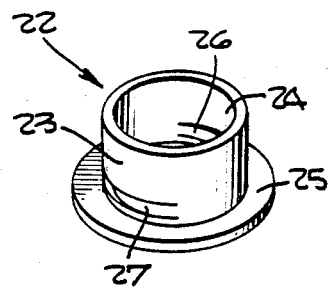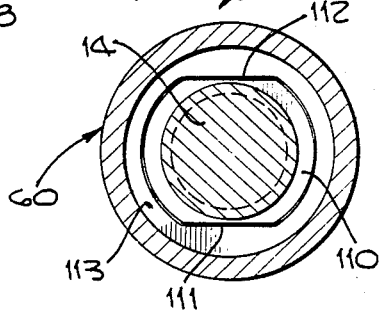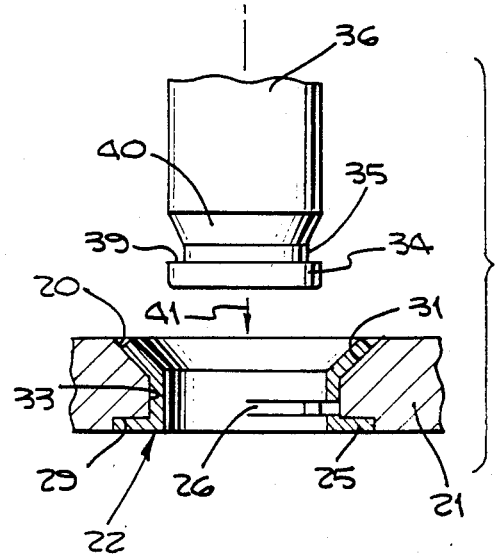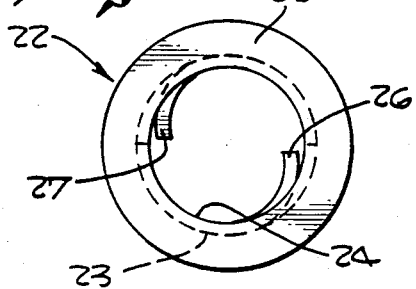

CAPTIVE PANEL FASTENER ASSEMBLY

This is a continuation of co-pending application Ser. No. 06/914,641 filed on Oct. 2, 1986, now abandoned.

BACKGROUND OF THE INVENTION

1. Field of the Invention

The invention relates to captive panel fastener assemblies; and, more particularly, to an improved fastener assembly for aircraft for holding the head and shank of the bolt of the fastener assembly away from an aperture in an aircraft panel in a first position while permitting the bolt to be pushed to a second position where the head abuts against the aircraft panel and the shank enters the aperture in the aircraft panel for subsequent connection to a mating receptacle assembly mounted to a sub-structure of the aircraft.

2. Description of the Prior Art

Panel fasteners for aircraft are well known. Usually, such fasteners secure a panel to an aircraft by insertion through an opening in the aircraft panel and a receptacle attached to the panel on the blind side is threaded to the shaft of the fastener, the enlarged head abutting against the panel on the access side thereof. Means have been suggested in the prior art for preventing the fastener from becoming disengaged from the panel when the fastener is threaded out of engagement with the receptacle.

In certain applications, the panels may be made of composite materials and such materials may be easily cracked or delaminated if the load on the panel fastener assembly is not distributed over the area surrounding the hole.

In Gulistan U.S. Pat. No. 4,285,380, a panel fastener is disclosed having a stud nut with an internally threaded bore mounted to a grommet assembly installed in a panel. The nut is adapted to threadably engage a threaded nut mounted to a subpanel. In one position, the nut is held outwardly away from the panel by a retaining ring in the grommet assembly trapped in a groove adjacent the nose of the nut. When the nut is pushed inwardly of the panel, the retaining ring in the grommet assembly rides over the shank of the nut until it abuts against the nut head thereby holding the nut to the panel in an inward position until the nut is pulled away from the panel. The ring then rides along the nut shank until it re-enters the groove adjacent the nose of the nut.

Obviously, the grommet assembly of Gulistan requires a number of carefully machined parts and a relatively thick panel 16 for installation. Gulistan also requires a rather intricate hole to be formed in the panel for the grommet assembly.

In Dey U.S. Pat. No. 4,324,517, a panel fastener assembly is disclosed for joining a panel to a sub-panel. This assembly shows a nut having an internal thread fixed to a grommet assembly installed in the panel. A receptacle assembly is attached to the sub panel. The grommet assembly has a retainer ring which engages a groove in the nut body when the nut is in the outwardly extended or withdrawn position and disengaged from the receptacle assembly. As can be seen in FIGS. 5 and 8 of Dey, a number of carefully machined parts make up the panel fastener assembly. Further, as can be seen in FIG. 1 of Dey, a relatively thick panel 4 is required for installation of the grommet assembly.

Thus, in both Gulistan and Dey, a number of parts are required which must be carefully machined and sub-assembled. The sub-assemblies require a relatively thick panel for installation and add weight to the installation. Certain panels, such as car door panels and the like, must be relatively thin and are light in weight. Thus, any fastener assemblies used in such panels must be very small and light weight. The installations of Gulistan and Dey are thick and heavy and add to the weight of the installation. This is highly undesirable, particularly in aircraft installations where it increases the payload of the aircraft.

There is thus a need for a panel fastener assembly which can fasten a panel to a sub-panel where the bolt thereof may be held in a withdrawn or outward position without disengagement from the panel until it engages a fastening member, such as a stud, on the subpanel. Such a fastener assembly should be light weight, be comprised of relatively few parts, be easily manufactured and installed yet provide strength and rigidity to the installation.

SUMMARY OF THE INVENTION

It is an object of this invention to provide an improved simplified panel fastener assembly for securing a panel to a sub-structure.

It is further object of this invention to provide an improved panel fastener assembly having a bolt secured to a panel which can be held in a position away from the panel, then pushed to engage a fastener member on a substructure.

It is still another object of this invention to provide an improved panel fastener assembly having a sleeve mounted in a panel providing strength and rigidity to the hole in the panel increasing the life of the panel and distributing the load over the area surrounding the hole, the sleeve cooperating with a bolt secured to the panel to hold the bolt in a position extending away from the panel.

These and other objects are preferably accomplished by providing a captive panel fastener assembly for joining a panel to a sub-structure. The fastener assembly includes a sleeve bolt, a grommet assembly which is attached to the panel and a receptacle assembly which is attached to the sub-structure. The sleeve bolt passes through the grommet assembly and engages the receptacle assembly thereby joining the panel and the sub-structure. The bolt includes an enlarged head at one end, an intermediate body portion and a nose at the other end. A groove is provided between the nose and the body portion of the bolt. The grommet assembly includes a sleeve in a hole in the panel and the sleeve has a plurality of resilient inwardly extending tangs formed out of the body of the sleeve which tangs move inwardly upon insertion of the nose through the sleeve until the nose moves past the tangs and the tangs enter the groove and return to their original inwardly extending position thereby retaining the bolt in a hold out condition with respect to the panel while permitting the bolt to be pushed to a position wherein the tangs ride along the body portion of the bolt until the head thereof abuts against the panel. Thus, the sleeve bolt is retained in the panel and remains in its withdrawn position when the panel is disengaged from the sub-structure.

The sleeve thus lines and stiffens the hole providing strength thereto and increasing its life by eliminating wear. The arrangement herein is particularly suited for use in relatively thin panels or panels of composite materials since the sleeve does not require a large hole for installation and the load is distributed over the area surrounding the hole.

BRIEF DESCRIPTION OF THE DRAWINGS

FIG. 1 is a side elevation view partly in section showing a panel fastener assembly in accordance with the invention associated with a panel and sub-structure;

FIG. 3 is a perspective view of the sleeve alone of FIG. 1 prior to installation;

FIG. 4 is a bottom plan view of the sleeve of FIG. 3;

FIG. 5 is a vertical view illustrating the assembly of the bolt of the panel assembly of FIG. 1 into the sleeve thereof;

FIG. 6 is a vertical view of the final assembly of the components of FIGS. 1 to 4;

FIG. 7 is a vertical view, partly in section, of a modification of the panel assembly of FIGS. 1 to 5;

FIG. 8 is a vertical view of the installed position of the bolt of FIG. 6;

DESCRIPTION OF THE PREFERRED EMBODIMENT

Figure 2:
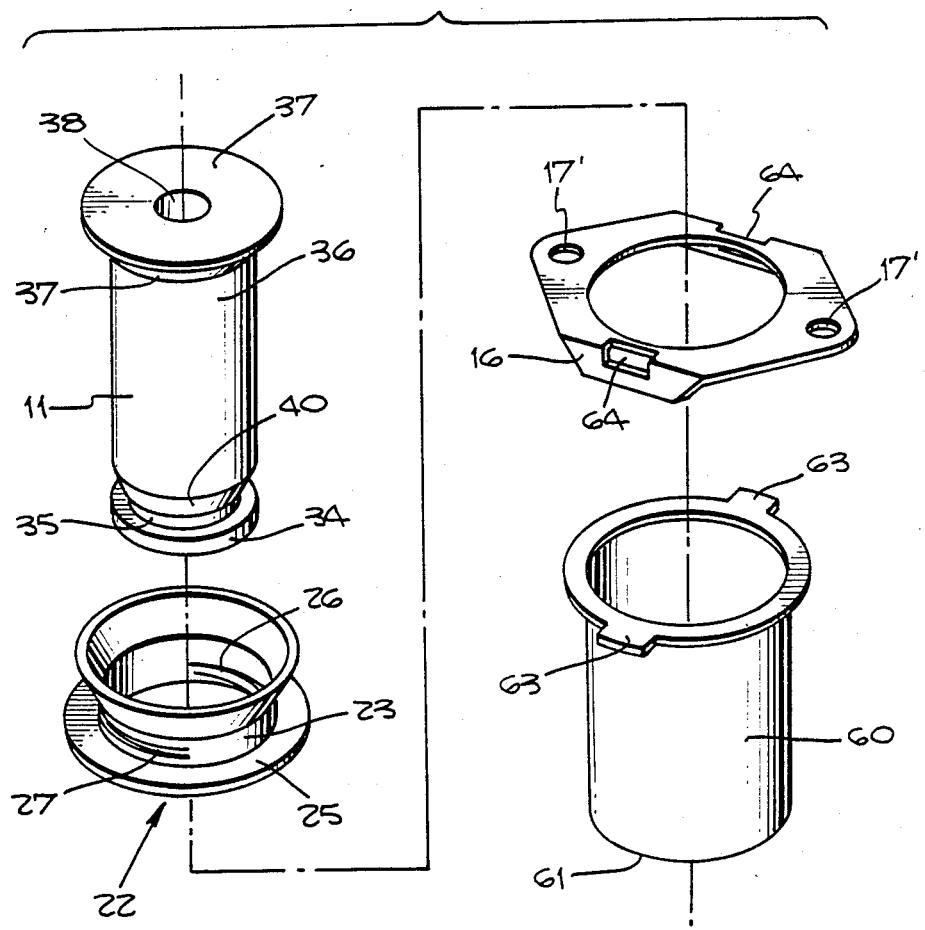
FIG. 2 is an exploded view of the fastener assembly of FIG. 1 in accordance with the teachings of the invention.

Referring now to FIG. 1 of the drawing, a panel fastener assembly 10 is shown associated with a structural panel 21 and a sub-structure 18. Grommet assembly 22 is shown installed in countersunk opening 20 aligned with hole 33 in access panel 21 in accordance with the teachings of the invention. Assembly 10 is comprised of a sleeve bolt 11 adapted to pass through grommet assembly 22 and engage and mate with a receptacle assembly 12. Bolt 11 may be internally threaded at threads 13 and adapted to engage and mate with a threaded stud 14 in receptacle assembly 12.

As seen in FIG. 3, grommet assembly 22 is shown prior to installation in countersunk opening 20 of FIG. 1. Thus, grommet assembly 22 (or sleeve) includes a generally cylindrical and thin-walled body 23 having a throughbore 24 and a generally circular flange 25 at one end. A pair of tangs 26, 27 (see also FIG. 4) are stamped out of the thin-walled body 23 extending inwardly as seen in FIG. 4. These tangs 26, 27 extend circumferentially about body 23 and are generally diametrically opposite each other. The body 23 is of course made of a suitable material, such as any suitable metallic material allowing the tangs to be stamped out from the remainder of the body 23 and impart resiliency thereto. That is, as seen in FIG. 4, pushing outwardly on tangs 26, 27 in a direction away from the longitudinal axis of body 23 will force the same outwardly back and flush with the remainder of body 23.

Referring again to FIG. 1, body 23, in the form shown in FIG. 3, is inserted through hole 33 in the direction of arrow 28 until flange 25 enters a counterbore 29 formed in surface 30 of panel 21 so that the outer surface of flange 25 is flush therewith. The other end, as end 31 in FIG. 1, is deformed to force end 31 against countersunk opening 20, formed in surface 32 of panel 21, thereby conforming the same with respect thereto.

Sleeve bolt 11 (FIG. 2) includes a nose 34, an annular groove 35 adjacent nose 34 and a generally cylindrical shank 36. An enlarged head 37 is provided at the end of shank 36 and adapted to abut or bear against end 31 of grommet assembly 22 when threaded to the stud 14 of receptacle assembly 12 as will be discussed. A countersunk hole 19 in subpanel 18 is aligned with hole 33 in top panel 21. Although one or both of these panels 18, 21 may be of composite material, or be relatively thin, of course any suitable panels may be secured together in accordance with the teachings of the invention.

Figure 10:
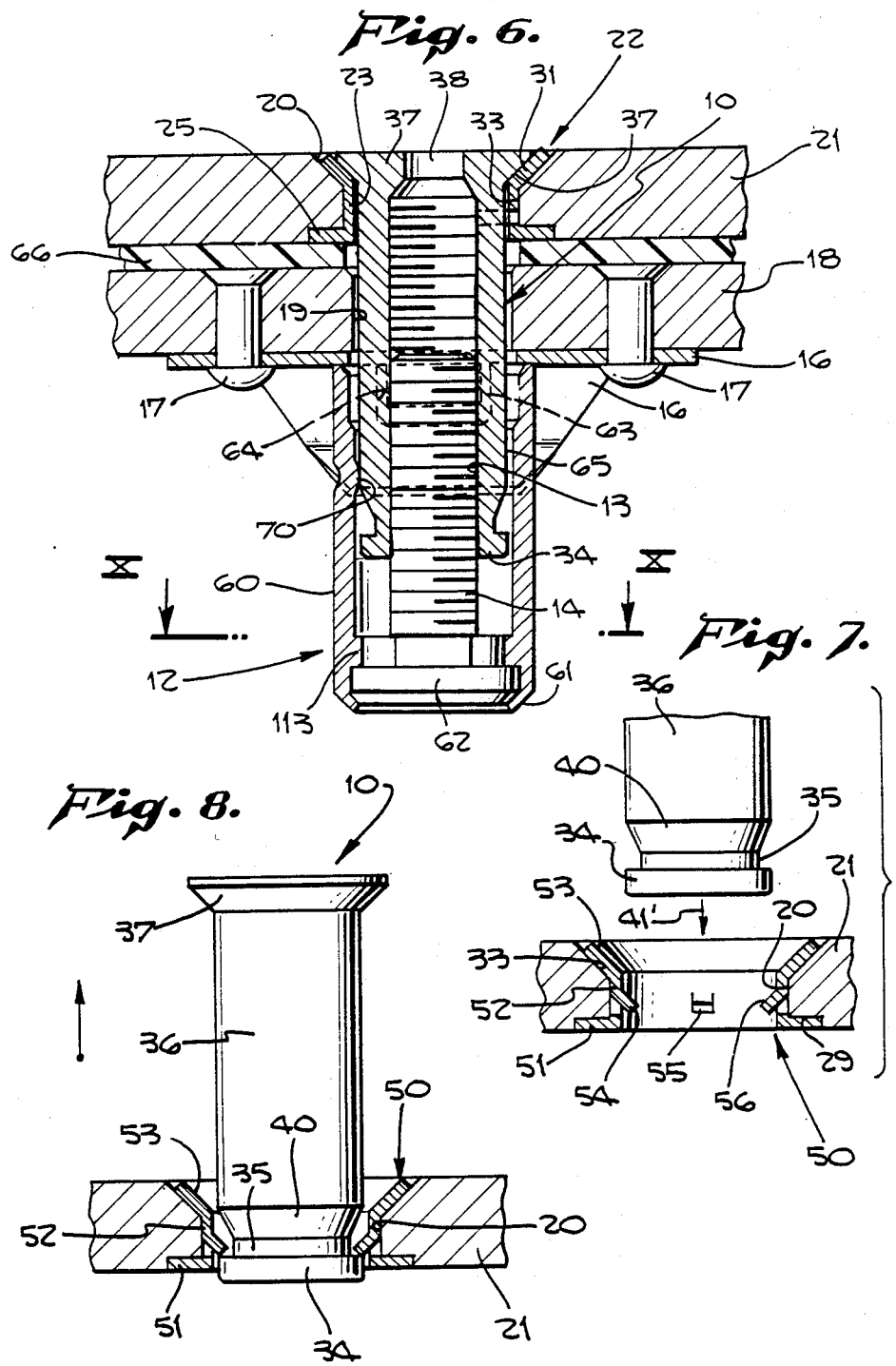
FIG. 10 is a view taken along lines X—X of FIG. 1.

Receptacle assembly 12 FIG. 2) includes a receptacle bracket or basket 16, a barrel 60 and an externally threaded stud 14. As seen in FIG. 1, the lower end 61 of barrel 60 is crimped about the base 62 of stud 14 and are deflected inwardly to engage the stud 14 and connect the barrel 60 thereto. As seen in FIG. 2, the stud 14 has a boss 110 with flattened areas 111, 112 (see also FIG. 10). As seen in FIG. 1, barrel 60 has an inwardly extending peripheral wall 113 configured similarly to boss 110 (FIG. 10). This is an antirotation feature preventing stud 14 from rotating within barrel 60 thereby allowing the stud 14 and barrel 60 to mate and lock and act as one unitary element. Barrel 60 also includes tabs 63 which are inserted in a pair of slots 64 formed in basket 16, thereby connecting the barrel 60 to the basket 16. Slots 64 are circumferentially greater in length than the width of tabs 63 thereby permitting the barrel 60 and stud 14 to rotate to a limited degree with respect to basket 16. Basket 16 is secured to sub-structure 18 (FIG. 6) by any suitable means, such as rivets 17 passing through holes 17' (FIG. 2) in basket 16. Although receptacle assembly 12 and basket 16 have been described as an assembly of individual components, obviously a single element may be used.

Sleeve bolt 11 is shown in FIG. 1 in its disengaged and withdrawn position with respect to panel 21. Bolt 11 is secured by tangs 26, 27 engaging groove 35.

The installation of assembly 22 is of course made prior to insertion of bolt 11 therein. This is shown in FIG. 5 wherein bolt 11 is inserted into assembly 22 in the direction of arrow 41. Nose 34 moves past tangs 26, 27 pushing the resilient tangs 26, 27 outwardly or away from the central axis of bolt 11. Nose 34 thus moves past tangs 26, 27 until the tangs 26, 27 enter groove 35 returning to their original position shown in FIG. 4 thus resiliently grasping bolt 11 in groove 35 and holding the same in the hold out position shown in FIG. 1. The bolt 11 can now be moved in the direction of arrow 42 (FIG. 1) to the final installed position shown in FIG. 6 wherein bolt 11 is threaded to stud 14 in receptacle assembly 12. As bolt 11 is moved from the FIG. 1 to the FIG. 6 position, tangs 26, 27 ride up tapered portion 40 of bolt 11 and along shank 36 until head 37 engages end 31 of assembly 22 as seen in FIG. 6. The tangs 26, 27 thus surround bolt 11 between head 37 and the remainder of shank 36. When unthreaded from stud 14, bolt 11 can then be moved in the direction of arrow 28 (FIG. 1) from the FIG. 6 to the FIG. 1 position wherein tangs 26, 27 ride back along shank 36 until they enter groove 35 as seen in FIG. 1.

Further, although two such tangs are shown in FIGS. 1 to 5, obviously, more than two may be provided. Also, although the tangs 26, 27 are shown as lying in the same plane, which is preferred so that the sleeve may be installed in relatively thin panels, obviously such tangs need not be in the same plane. It is preferred that the tangs 26, 27 be both circumferentially disposed about the outer surface of body portion 23 and preferably diametrically opposed from each other to distribute the weight of bolt 11 bearing thereon.

Further, although circumferencial tangs have been disclosed in FIGS. 1 to 5, such tangs may be vertically disposed. This is shown in FIG. 7 wherein like numerals refer to like parts of FIGS. 1 to 6, the subpanel 18 and receptacle assembly 12 being omitted for convenience of illustration. Thus, sleeve assembly 50 is shown having a flange 51 (similar to flange 25) and a cylindrical thin walled, hollow body portion 52 (similar to body portion 23) with a deformed end 53 (similar to end 31). A plurality of tangs, three being visible in FIG. 6, such as tangs 54 to 56, are stamped out of body portion 52. Each tang 54 to 56 extends inwardly toward the central axis of sleeve assembly 50 as seen in FIG. 7 and downwardly in the direction of arrow 41', as shown. Another tang identical to tangs 54 to 56 and extending out of body portion 52 (not visible) may be provided in the wall of body portion 52 so that four generally equally spaced tangs are provided circumferentially about the perimeter for body portion 52 and diametrically opposite each other for the reasons previously discussed. Of course, a plurality of such tangs may be provided and they need not lie in the same plane.

The assembly of bolt 11 in FIG. 7 is identical to the assembly of bolt 11 in the assembly of FIGS. 1 to 6. Thus, bolt 11 is inserted into sleeve assembly 50 in the direction of arrow 41' with nose 34 entering sleeve assembly 50 and pushing the tangs 54 through 56 outwardly under their own resilience until nose 34 passes by tangs 54 through 56. At this time, the tangs 54 through 56 spring back to the position shown in FIG. 8 within groove 35 grasping the bolt 11 and holding it in the position shown in FIG. 8. Of course, bolt 11 may now be pushed inwardly further to mate with a receptable assembly on a subpanel as discussed hereinabove with respect to the assembly shown in FIGS. 1 to 6 and disengaged and withdrawn therefrom as previously discussed with respect to the embodiment of FIGS. 1 to 6.

Referring to both embodiments, rotation of the sleeve bolt 11 will cause it to threadably engage stud 14 of the receptacle assembly 12. Preferably, bolt 11 and stud 14 are provided with double lead threads in order to decrease the time and motion required to remove and install the panel.

Barrel 60 may include inwardly facing protrusions 70 (FIG. 1) which frictionally engage the exterior surface 65 of sleeve bolt 11 when it is threadedly engaged on stud 14 thereby securely locking the sleeve bolt 11 to receptacle assembly 12 when panel 21 is secured to sub-structure 18. In the preferred embodiment, these protrusions 70 are preferably formed by deforming the exterior of barrel 60 but any suitable friction lock between the internal surface of barrel 60 and the external surface 65 of bolt 11 may be provided, such as a plastic insert installed through the side of barrel 60.

As heretofore discussed, the grommet assembly 22 may be flush with the surface 30 of panel 21. However, in some applications, the thickness of panel 21 and sealing requirements may necessitate the use of a gasket 66 between the panel 21 and substructure 18.

Figure 9:
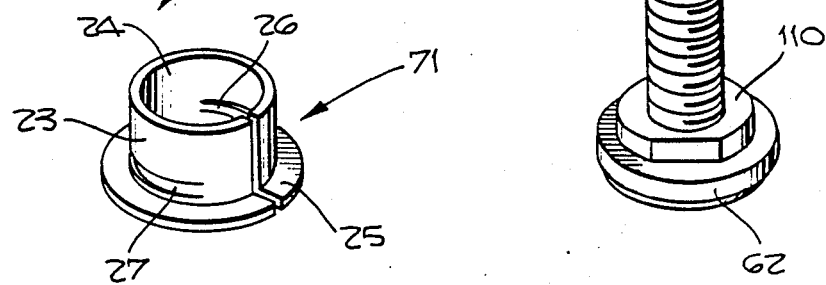
FIG. 9 is a view similar to FIG. 3 showing an alternate sleeve of the invention.

It can be seen that I have described an assembly wherein bolt hold out and retaining means is manufactured from a single part and is simple and easy to install. The tangs may be quickly and easily stamped or deep drawn out of the sleeve body. Thus, no careful machining of parts is necessary. Thus, the sleeve may be a one piece machined construction or a slotted metal stamping. That is, the sleeve may be manufactured in one piece and the tangs stamped out or the sleeve may be manufactured from flat stock which is then formed and rolled in an open cylinder or split ring as seen in FIG. 9. Thus, sleeve 71 has been formed from flat stock, the reference numerals referring to like parts of the sleeve 22 of FIG. 3. Sleeve assembly 50 in FIG. 7 may also be a split ring.

Since the tangs take up relatively little area of the sleeve and the sleeves provide rigidity to the mounting holes, the lightweight sleeves can be installed in very thin and/or light weight panels of all types of materials, even composite materials. Thus, excessive weight is eliminated.

The tangs in both embodiments slide or ride along the bolt body until they abut against the end nose of the bolt. Thus, the tangs replace the various components used to accomplish the same in the prior art, such as grommet assemblies in the Dey and Gulistan patents heretofore discussed. Since the tangs of both embodiments are preferably diametrically opposed to each other, the bearing of the bolt on the tangs in the sleeve is equally distributed while the sleeve lines and stiffens the mounting hole providing strength to the hole and increasing the life thereof.

Figure 11:
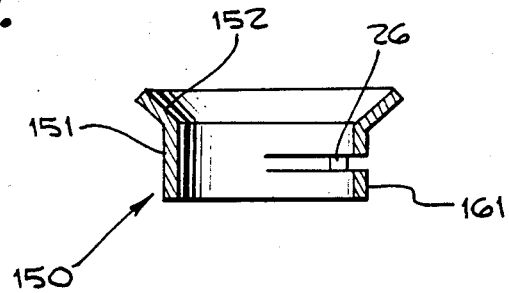
FIG. 11 is a vertical view of a modified grommet assembly in accordance with my invention.

Although grommet assemblies 22 and 50 have been heretofore described as having a cylindrical thin walled portion 23 or 52 deformable or flared into countersunk opening 20, such flaring might be undesirable in the case of panels made of certain materials. Thus, as seen in FIG. 11, a grommet assembly 150 may be provided otherwise similar to assembly 23 of FIG. 3 wherein like numerals refer to like parts thereof. In this alternative embodiment of the invention, flange 25 has been eliminated and body portion 151 has a preformed countersunk or flared portion 152 at its upper end as shown adapted to fit into and conform to countersunk opening 20 of FIG. 1. The grommet assembly 150 of FIG. 11 has tangs 26 and 27 as heretofore discussed but may of course be provided with tangs as in the embodiment of FIGS. 7 and 8 and may be a split ring as in the embodiment of FIG. 9. Also, grommet assembly 150 may be formed from a flat metal stamping that is rolled into a cylinder forming a slot between the free ends thereof as illustrated in FIG. 9.

Figure 12:
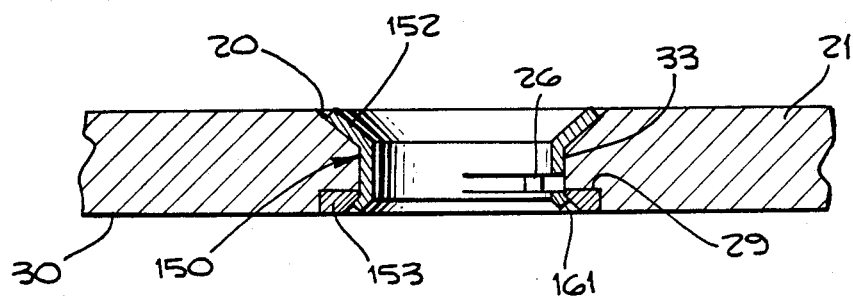
FIG. 12 is a vertical cross-sectional view, similar to FIG. 5, the, bolt thereof not present, showing the installation of the grommet assembly of FIG. 11.
Figure 13:
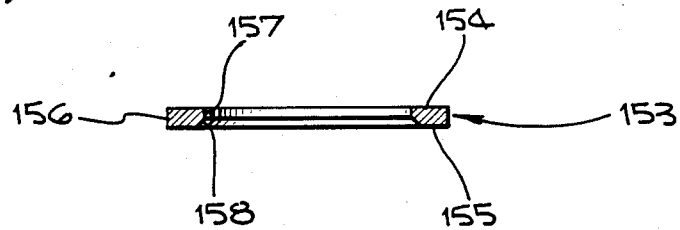
FIG. 13 is a vertical cross-sectional view of the washer alone of the assembly of FIG. 12.

In the embodiment of FIG. 11, the grommet assembly 150 is installed to panel 21 (FIG. 12) using a washer 153 as seen in detail in FIG. 13. Washer 153 is preferably circular and may have a flat upper wall 154, a flat bottom wall 155 and an outer straight peripheral wall 156. Inner circular wall 157 may taper downwardly and outwardly, at tapered wall 158, away from the central longitudinal axis of washer 153. Washer 153 may be of stainless steel.

As seen in FIG. 12, grommet assembly 150 is disposed in hole 33 in panel 21 with flared portion 152 abutting against and conforming to countersunk opening 20. Washer 153 is disposed in the countersunk hole 29 formed in the blind side 30 of panel 21. The lower end 161 of grommet assembly 150 is swaging against washer 153.

The use of the washer 153 is particularly effective in the panel fastener assembly 10 of FIG. 1 when used with composite materials. The washer 153 has a wider surface 154 that bears against the surface 29 of panel 21 than prior art assemblies. Since the washer 153 is always the same thickness, swaging of end 161 of grommet assembly 150 quickly and easily forms a lip bearing against washer 153 and holding it to panel 21 regardless of the thickness of panel 21.

Although a specific receptacle assembly has been described, any suitable receptacle assembly may be used.

Although I have described the fastener assembly with reference to certain preferred embodiments, it is to be understood that the appended claims describe the scope of the invention and various changes and modifications may occur to one skilled in the art without departing from the scope of the invention.

I claim:

1. In a captive panel fastener assembly comprising a bolt having an enlarged head at one end, a nose at the other end, and an intermediate body portion, a groove provided on the bolt between the nose and the body portion, a panel having an access side and a blind side and a hole therein with retaining means mounted in said panel for retaining the bolt in a first position held out from said panel and for retaining said bolt in a second position wherein said bolt is adapted to engage a receptacle assembly mounted in an adjacent subpanel, the improvement which comprises:

said retaining means including a sleeve mounted in said hole in said top panel, said sleeve including a generally cylindrical thin walled main body portion having a preformed outwardly flared head at the upper end thereof mating with a countersunk opening surrounding said hole in the access side of said panel, said sleeve having a plurality of resilient tangs therein extending inwardly toward the central longitudinal axis of said sleeve adapted to move away from the central longitudinal axis of said sleeve when said bolt is inserted into said sleeve and said nose engages and abuts against said tangs, then move back in the direction toward the central longitudinal axis of said sleeve and into the groove of said bolt when said nose moves therepast, and a countersunk opening provided on the blind side of said panel surrounding said hole, a washer disposed in said last-mentioned countersunk opening, the lower end of said main body portion being swaged against said washer.

2. In a captive panel fastener assembly comprising a bolt having an enlarged head at one end, a nose at the other end, and an intermediate body portion, a groove provided on the bolt between the nose and the body portion, a panel having a hole therein with retaining means mounted in said panel for retaining the bolt in a first position held out from said panel and for retaining said bolt in a second position wherein said bolt is adapted to engage a receptacle assembly mounted in an adjacent subpanel, the improvement which comprises:

said retaining means including a sleeve mounted in said hole in said top panel, said sleeve having a plurality of resilient tangs thereon extending inwardly toward the central longitudinal axis of said sleeve adapted to move away from the central longitudinal axis of said sleeve when said bolt is inserted into said sleeve and said nose engages and abuts against said tangs, then move back in the direction toward the central longitudinal axis of said sleeve and into the groove of said bolt when said nose moves therepast, said panel having an access side and a blind side, said sleeve including a generally cylindrical thin walled main body portion having a preformed outwardly flared head at the upper end thereof mating with a countersunk opening surrounding said hole in the access side of said panel with a countersunk opening provided on the blind side of said panel surrounding said hole, and a washer disposed in said last-mentioned countersunk opening, the lower end of said main body portion being swaged against said washer.

* * * * *